United States Patent [19]
Samson et al.

[11] Patent Number: 5,995,750
[45] Date of Patent: Nov. 30, 1999

[54] MEMORY PROTECTION SYSTEM FOR A MULTI-TASKING SYSTEM

[75] Inventors: Allan L. Samson, Fort Lupton; Thomas C. Green, Boulder, both of Colo.

[73] Assignee: Micro Motion, Inc., Boulder, Colo.

[21] Appl. No.: 08/991,422

[22] Filed: Dec. 16, 1997

[51] Int. Cl.$^6$ ............................................. G06F 12/14
[52] U.S. Cl. ........................ 395/677; 711/201; 711/163
[58] Field of Search .................................. 395/677, 670; 711/201, 163, 207

[56] References Cited

U.S. PATENT DOCUMENTS

| | | | |
|---|---|---|---|
| 5,440,710 | 8/1995 | Richter et al. | 711/207 |
| 5,539,899 | 7/1996 | Huynh et al. | 711/171 |
| 5,577,219 | 11/1996 | Timko et al. | 711/207 |
| 5,590,351 | 12/1996 | Sowadsky | 395/800.23 |
| 5,680,568 | 10/1997 | Sakamura | 711/220 |
| 5,787,492 | 7/1998 | Shuma et al. | 711/201 |

*Primary Examiner*—Lucien U. Toplu
*Attorney, Agent, or Firm*—Duft, Graziano & Forest, P.C.

[57] ABSTRACT

A memory protection system in a multi-tasking system for preventing a currently running application from writing data to a memory segment storing data for a second application. The memory protection system transmits m upper address defining a memory segment of the currently running application to the memory from a memory register. The memory protection system detects when a currently running application generates an invalid address and disables the data operation to prevent the corruption of data in a memory segment storing data for the currently running application. The system verifies that the m upper address bits in the memory register after the application is completed are equal to m upper address bits of the memory segment of the completed application.

12 Claims, 5 Drawing Sheets

MEMORY PROTECTION SYSTEM FOR A MULTI-TASKING SYSTEM

FIELD OF THE INVENTION

The present invention relates to a memory protection system for a multi-tasking system. More particularly, the present invention relates to a system which prevents an application from writing to a memory segment storing data for a second application. The memory protection system of the present invention also detects when an application attempts to write to the memory segment of a second application.

PROBLEM

Multi-tasking systems are commonly known in the computing arts. In a multi-tasking system, multiple applications are concurrently executed by a processor. The advantage of a multi-tasking system is that a single processor can simultaneously perform multiple functions to minimize the amount of resources needed to perform the multiple functions.

A typical multi-tasking system requires a processor, a memory associated with the processor, and an operating system which schedules processing of the applications and manages the reading and writing of data to the memory. The system runs a plurality of applications. Each application is executed by the processor for a predetermined amount of time. Data resulting from the execution of the application is written to the memory and stored for future use. The processor resumes executing the application at a later time using the stored data. The multi-tasking system may include a memory protection scheme to prevent a first application from writing over data of a second application. Otherwise, data for one or both of the applications will be corrupted and the applications will fail.

One example of a multi-tasking system is a Windows operating system running on a personal computer. Each window that is opened in a Windows operating system is a different software application currently being run by the system. The operating system schedules processing time for each application on a central processor which executes each application for a predetermined amount of time. The resulting data is stored in a Random Access Memory (RAM) for future use. In a Windows system, the operating system has a memory management scheme to prevent one application from writing data to a location in the RAM which is storing data for a second application.

Multi-tasking systems may be operated on a smaller scale using a microprocessor. An example of a smaller multi-tasking system is a microprocessor which concurrently executes a plurality of applications monitoring different properties of a fluid flowing through a flowmeter. The operating system of such a multi-tasking system is generally limited to the critical system operations due to the capabilities of the microprocessor. In these smaller systems, the memory associated with the processor is generally divided into a plurality of segments. Each memory segment stores data for one application to simplify memory management required by the operating system. It is a problem to prevent one application from writing data to a memory segment storing data of a second application.

In order to address this problem, some microprocessors provide internal or external memory protection features to prevent an application from writing data to an address outside of its assigned memory segment. However, microprocessors with memory protection features are typically very expensive and have more complex circuitry than a simpler microprocessor. It may be desirable to use a less expensive microprocessor without a memory protection system because of cost and design considerations. Therefore, there is a need in the art for an inexpensive and simple scheme for providing memory protection to a multi-tasking system with a microprocessor that does not have memory protection features.

SOLUTION

The above and other problems are solved and an advance in the art is achieved by the present invention which relates to a memory protection system for a processor controlled multi-tasking system. In accordance with the present invention, a memory protection system is provided by a combination of software executed by the processor and circuitry external to the processor. The present invention provides a relatively simple and inexpensive memory protection system to be used in conjunction with a processor that does not have internal memory protection capabilities.

A multi-tasking system includes a microprocessor, a memory associated with the microprocessor, and an operating system. Each location in the memory is defined by n lower address bits and m upper address bits. The memory is divided into a plurality of memory segments each of which is defined by a unique combination of m upper address bits. Each application being executed by the processor has assigned one memory segment which stores data for the application. The operating system manages the execution of the applications by the processor.

In accordance with the present invention, a memory protection system includes a memory address register, an upper address bus extending from the memory register to the memory, a lower address bus extending from the processor to the memory, and error detection circuitry. The memory register stores m bits. Before an application is executed by the microprocessor, the m upper address bits for the memory segment of the application are written to the memory register. The m upper bits stored in the memory register are transmitted to the memory via the upper address bus while the application is being executed. The transmitting of the m upper address bits from the memory register prevents an application from writing to an address outside its assigned memory segment.

Each application is compiled to generate addresses for read/write operations that have the m upper address bits set equal to a constant, such as all 0s, and n lower address bits. The m upper address bits are used for error detection and the n lower address bits indicate a memory location in the assigned memory segment of the application.

The n lower address bits generated by the application are transmitted to the memory via the lower address bus. The n lower address bits are combined with the m upper address bits from the memory register to specify a memory location in the assigned memory segment of the application. The resulting address is used to perform a read/write operation.

Although the m upper address bits from the memory register prevent the selected application from reading/writing outside of its assigned memory segment, the selected application may attempt to perform a read/write operation outside of its assigned memory segment under certain conditions. One such condition is a stack overflow error in which an application needs to store data in excess of the capacity of its memory segment. In order to store the data, the application generates an address with m upper address bits that are not equal to the constant in an attempt to write to an address outside the assigned memory segment of the application. However, the combination of the m upper address bits from the memory register and the generated n lower bits would be an address in the assigned memory segment of the application which may contain valid data. If the read/write operation proceeds, valid data for the selected application will be corrupted.

In order to prevent valid data in the assigned memory segment of the application from being corrupted, error detection circuitry determines if the m upper address bits generated by the application are equal to the constant. If the generated m upper address bits are not equal to the constant, the present invention generates an error signal. The read/write operation can be halted in response to the error signal or an error interrupt may be caused by the error signal.

Errors in the memory register may be detected by the operating system after execution of the application is completed. The m upper address bits in the memory register are read by the operating system. The m upper address bits from the memory register are compared to the m upper address bits defining memory segment of the completed application. If the m upper address bits of the completed application and the memory register are not equal, the operating system generates an error interrupt. This test assures that data was not corrupted by a malfunction in the memory register.

DETAILED DESCRIPTION

Figure 1:
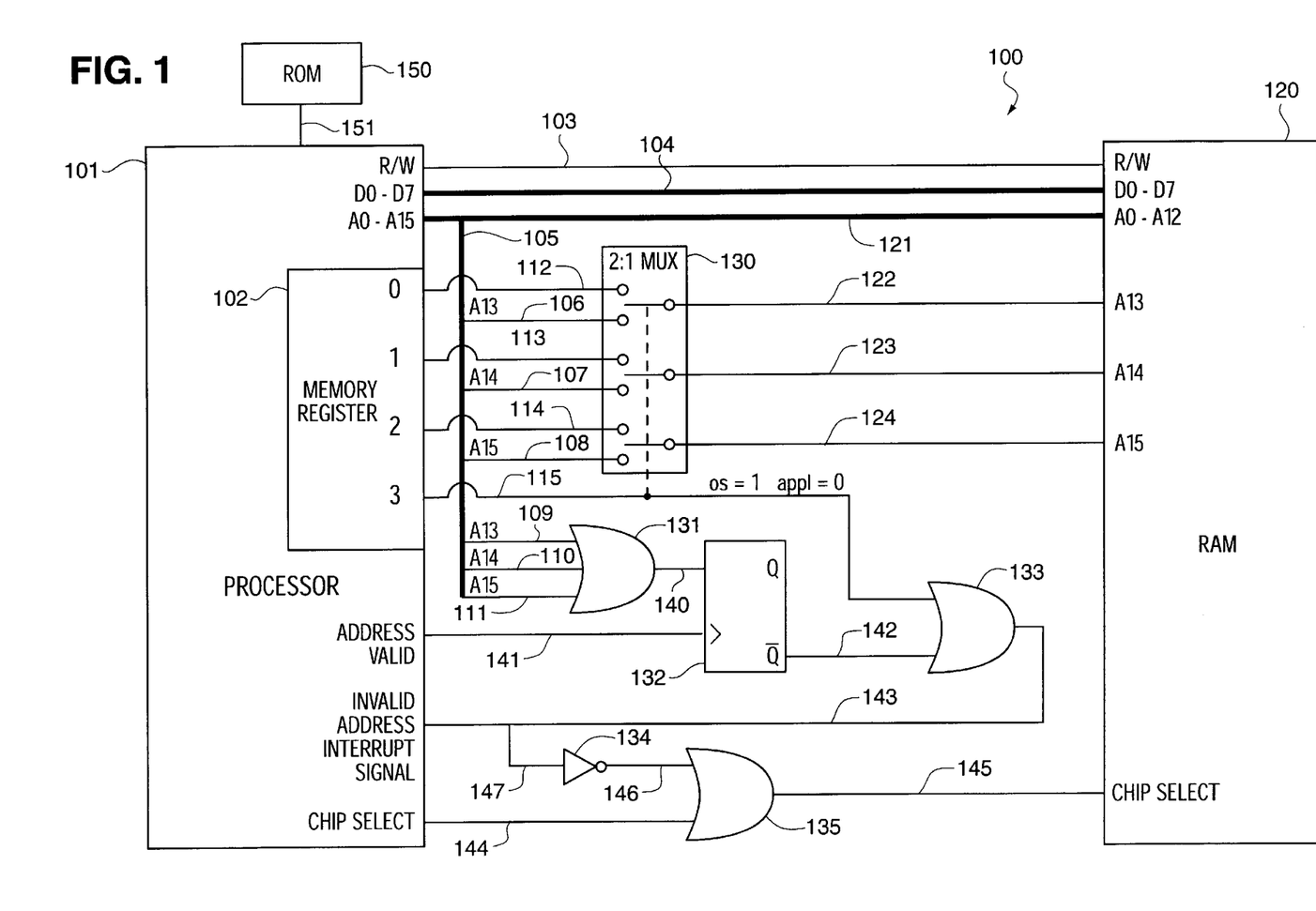
FIG. 1 is a block diagram of one possible preferred exemplary embodiment of a processor controlled multitasking system with memory protection features of the present invention.

FIG. 1 illustrates a preferred exemplary embodiment of a multi-tasking system 100 having the memory protection features of the present invention. Processor 101 executes instructions for a plurality of applications. The instructions are stored in Read Only Memory (ROM) 150. Processor 101 receives the instructions from ROM 150 via data bus 104 which is connected to ROM 150 by bus 151. A memory such as RAM 120 is associated with processor 101 to store data needed to execute each of the plurality of applications. Each address in RAM 120 is defined by m upper address bits and n lower address bits. In the preferred embodiment, RAM 120 is a 64-kilobyte memory, however the present invention can be scaled to be used with any size memory.

Memory register 102 stores m bits and is connected to multiplexor 130 by m paths 112–114. In the preferred embodiment, memory register 102 is internal to processor 101. However, memory register 102 may be external to processor 101. A protect signal is extended over path 115 by memory register 102 to indicate if an application or an operating system is being executed. The protect signal is high or a 1 over path 115 when the operating system is being executed in the preferred embodiment. When an application is being executed, the protect signal over path 115 is low or a 0. In the preferred embodiment, the protect signal on path 115 determines which path multiplexer 130 connects to RAM 120. The high protect signal disables the error detection circuitry when the operating system is being executed to prevent an error signal from being generated.

Multiplexor 130 connects m paths 112–114 from memory register 102 to m upper address lines 122–124, respectively, when a protect signal is low over path 115. When the protect signal over path 115 is high, multiplexor 130 connects m paths 106–108 from bus 105 to m upper address lines 122–124. Bus 105 splits from address bus 121 to provide m upper address bits directly from processor 101 to multiplexor 130 via m paths 106–108. The m paths 109–111 receive m upper address bits from bus 105 and apply the m upper address bits to the error detection circuitry of multitasking system 100.

Data bus 104 connects processor 101 with RAM 120 to transfer data between processor 101 and RAM 120. The type of data operation performed by RAM 120 is determined by a read/write signal which is transmitted from processor 101 to RAM 120 via read/write path 103. N lower address bits of an address are 10 transmitted by processor 101 to RAM 120 over lower address bus 121. An upper address bus, represented by m address lines 122–124, provides m upper address bits to RAM 120 from multiplexor 130. In the preferred embodiment, lower address bus 121 carries the 13 lower bits of an address and the upper address bus carries the upper 3 address bits of a 16 bit address in a 64-kilobyte memory. However, the number of n lower address bits and m upper address bits may be changed to operate with different design parameters.

Error detection circuitry detects an attempt by an application being executed by processor 101 to read/write data outside of its assigned memory segment. If the application does try to read/write outside its assigned memory segment, the error detection circuitry generates an error signal. The generating of an error signal either disables the data operation being performed or is transmitted to processor 101 which causes an error interrupt to prevent the application from completing the read or write operation.

The software applications are compiled to generate memory addresses for read/write operations having m upper address bits which are equal to a constant. The error detection circuitry determines if the m upper address bits are equal to the constant. An error signal is generated by the circuitry when the m upper address bits and the constant are not equal.

In the preferred embodiment, the constant for each of m upper address bits generated by an application is a 0. The error detection circuitry detects when any one of the m bits is a 1. The error detection circuitry includes OR gates 131, 133, and 135, latch 132, and inverter 134. OR gate 131 receives m upper address bits from processor 101 via m paths 109–111 and applies a signal over path 140. Latch 132 receives the signal from OR gate 131 via path 140 and an address valid signal from processor 101 via path 141. An address valid signal is transmitted by processor 101 to latch 141 if the application has generated a memory address. Latch 132 extends a signal to OR gate 133 via path 142. OR gate 133 receives the protect signal via path 115 and a signal from latch 132 via path 142. The output signal from OR gate 133 is extended to processor 101 over path 143. Path 147 splits from path 143 to apply the signal from OR gate 133 to inverter 134. The inverted signal is extended to OR gate 135 over path 146. OR gate 135 receives a signal over path 146 and a chip select signal over path 144. The resulting signal from OR gate 135 is applied to RAM 120 via path 145.

If an application generates an invalid address, the error detection circuitry operates in the following manner. OR gate 131 receives signals from m paths 109–111. At least one of the received signals is a high indicating a 1 and a high signal is applied to latch 132 over path 140. Latch 132 is set to output a high signal by receiving a high address valid signal from processor 101 via path 141. The valid address signal indicates that application has generated an address for a read/write operation. The reception of a high signal via path 140 strobes latch 132 to apply a low signal over path 142. OR gate 133 receives a low protect signal from processor 101 over path 115 and the low signal from latch 132 over path 142. The protect signal 115 is low to indicate an application is being executed by processor 101. The low protect signal 115 is ORed to the low latch signal by OR gate 133. The resulting low signal is extended over path 143 to processor 101 as a low error signal. Path 147 branches from path 143 and applies the low signal to inverter 134. The high signal from inverter 134 is applied to OR gate 135. A low chip select signal that causes the read/write operation to be completed is received by OR gate 135 via path 144. OR gate 135 ORs the low chip select signal and the high signal. A high signal is extended to RAM 120 via path 145. The high signal prevents the read/write operation from being completed.

If no error occurs from the address generated by the application, the error detection circuitry operates in the following manner. OR gate 131 receives signals from m paths 109–111. All of the received signals are low and a low signal is applied to latch 132 over path 140. Latch 132 is set to output a high signal by receiving a high address valid signal from processor 101 via path 141. The low signal is received over path 140 and causes the signal over path 142 to remain high indicating no error in the generated address. OR gate 133 receives a low protect signal from processor 101 over path 115 and the high signal from latch 132 over path 142. The low protect signal 115 is ORed to the high latch signal from path 142 by OR gate 133. The resulting high signal is extended over path 143 to processor 101 to indicate the address is valid. Path 147 branches from path 143 and applies the high signal to inverter 134. The low signal from inverter 134 is applied to OR gate 135. A low chip select signal that causes the read/write operation to be completed is received by OR gate 135 via path 144. OR gate 135 ORs the low chip select signal and the low signal. The resulting low signal is extended by OR gate 135 to RAM 120 via path 145. The low signal allows the read/write operation from being completed.

Figure 2:
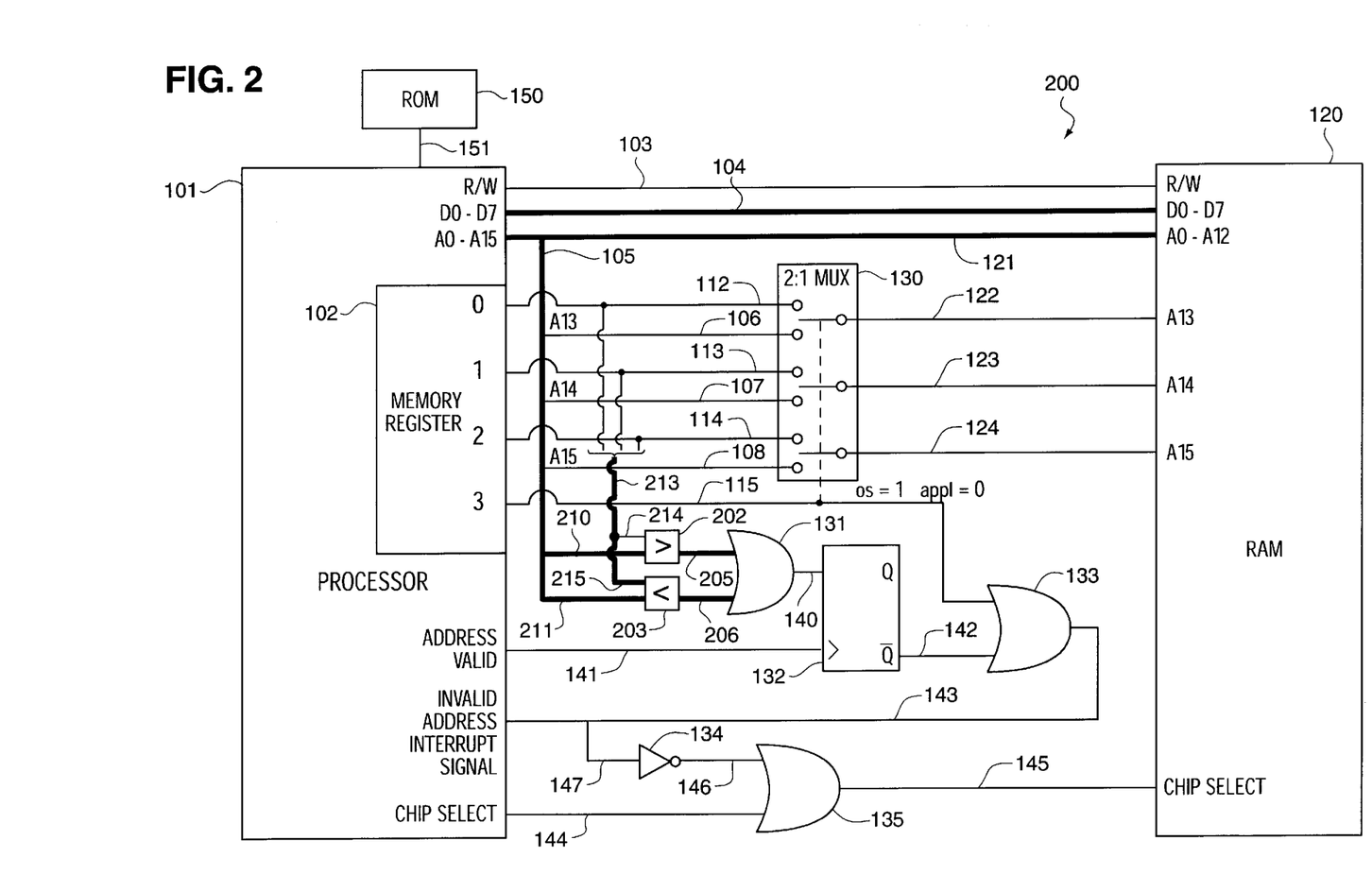
FIG. 2 is a block diagram of an alternative exemplary embodiment of a processor controlled multitasking system with memory protection features of the present invention.

FIG. 2 illustrates an alternative exemplary embodiment of the present invention. Multi-tasking system 200 is comprised of the same elements as multi-tasking system 100 with an additional logic unit defining greater than comparitor 202 and an additional logic unit defining less than comparitor 203 added to the error detection circuitry prior to OR gate 131. Bus 105 extends at least m upper address bits to the error detection circuitry. All or any portion of the lower n address bits may also be extended to the error detection circuitry. Greater than comparitor 202 receives at least m upper address bits over path 210 and less than comparitor 203 receives at least m upper address bits over path 211. The m upper address bits from memory register 102 are extended over bus 213 to the error detection circuitry. Greater than comparitor 202 receives the m upper address bits from bus 213 via path 214 and less than comparitor 203 receives the m upper address bits from bus 213 via path 215. Greater than comparitor 202 applies a signal to OR gate 131 via path 205 and less than comparitor 203 applies a signal to OR gate 131 via path 206.

In the alternative embodiment, the m upper address bits of each address generated by an application are equal to the unique combination of m upper address bits defining the memory segment storing data for the application. There are three types of addresses that can be generated in the alternative embodiment an address that is less than the lowest address in the application memory segment, an address within the application memory segment, and an address greater than the highest address of the application memory segment. An error occurs when the generated address is either greater than the highest address of the application memory segment or lower than the lowest address of the application memory segment.

When an address is generated that is less than the lowest address of the memory segment, the error detection circuitry operates in the following manner. The generated m upper address bits are received by greater than comparitor 202 via path 210. The m upper address bits from memory register 102 are received by greater than comparitor 202 via path 214. Greater than comparitor 203 compares the generated m upper address and the m upper address bits from memory register 102. The generated m upper address bits are less than the memory register m upper address bits and a low signal is transmitted over path 205 to OR gate 131. The low signal indicates that the generated address is less than the highest address of the memory segment and may be a valid address. The generated m upper address bits are received by less than comparitor 203 via path 211. The m upper address bits from memory register 102 are received by less than comparitor 203 via path 215. Less than comparitor 203 compares the generated m upper address and the m upper address bits from memory register 102. The generated m upper address bits are less than the memory register m upper address bits and a high signal is transmitted over path 206 to OR gate 131. The high signal indicates that the generated address is less than the lowest address in the address segment and an invalid address. The high signal from path 205 and low signal from path 204 are ORed by OR gate 131. The resulting high signal is extended over path 140 and the remainder of the error detection circuitry completes the operation for an error as described above in FIG. 1.

When an address is generated that is greater than the highest address in the memory segment, the error detection circuitry operates in the following manner. The generated m upper address bits are received by greater than comparitor 202 via path 210. The m upper address bits from memory register 102 are received by greater than comparitor 202 via path 214. Greater than comparitor 202 compares the generated m upper address and the m upper address bits from memory register 102. The generated m upper address bits are greater than the memory register m upper address bits and a high signal is transmitted over path 205 to OR gate 131. The high signal indicates that the generated m address is greater than the highest memory segment address and an invalid address. The generated m upper address bits are also received by less than comparitor 203 via path 211. The m upper address bits from memory register 102 are received by less than comparitor 203 via path 215. Less than comparitor 203 compares the generated m upper address and the m upper address bits from memory register 102. The generated m upper address bits are greater than the memory register m upper address bits and a low signal is transmitted over path 206 to OR gate 131. The low signal indicates the generated address is greater than the lowest memory segment address. The high signal from path 205 and low signal from path 206 are ORed. The resulting high signal is extended over path 140 and the remainder of the error detection circuitry completes the operation for an error as described above in FIG. 1.

When an address is generated that is greater than the lowest memory segment address and less than highest memory segment address, the error detection circuitry operates in the following manner. The generated m upper address bits are received by greater than comparitor 202 via path 210. The m upper address bits from memory register 102 are received by greater than comparitor 202 via path 214. Greater than comparitor 202 compares the generated m upper address and the m upper address bits from memory register 102. The generated m upper address bits are less than the memory register m upper address bits and a low signal is transmitted over path 205 to OR gate 131. The low signal indicates that the generated address is less than the highes segment address and may be a valid address. The generated m upper address bits are also received by less than comparitor 203 via path 211. The m upper address bits from memory register 102 are received by less than comparitor 203 via path 215. Less than comparitor 203 compares the generated m upper address and the m upper address bits from memory register 102. The generated m upper address bits are less than the memory register m upper address bits and a low signal is transmitted over path 206 to OR gate 131. The low signal indicates the generated address is greater than the lowest segment address and may be a valid address. The low signal from path 205 and the low signal from path 204 are ORed. The resulting low signal is extended over path 140 and the remainder of the error detection circuitry completes the operation for a proper generated address as described above in FIG. 1.

Figure 3:
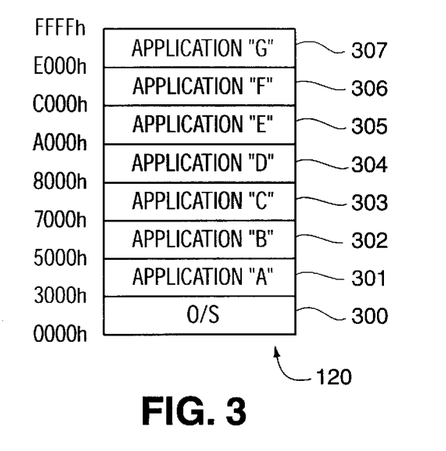
FIG. 3 is a block diagram of a memory in the multi-tasking system divided into a plurality of segments.

FIG. 3 illustrates RAM 120 which is divided into a plurality of segments 300–307. Each of segments 300–307 is defined by a unique combination of m upper address bits. The number of m bits required is determined by the number of segments in the memory. For example, Ram 120 is 64 kilobytes and is divided into 8 segments. M is equal to 3 and each segment is defined a unique combination of the upper 3 bits. In this example, the upper three bits of segments 300–307 are 000, 001, 010, 011, 100, 101, 110, and 111 respectively.

Multi-tasking system 100 runs an operating system and a plurality of applications A–G executed by processor 101. Each application A–G and the operating system store data in one of the segments 300–307 of RAM 120 as illustrated in FIG. 3. The present invention requires that each of the applications be compiled to generate addresses for data operations that have the upper m address bits set to a constant. For example, applications A–G generate addresses in which the m upper address bits are 0s in the preferred embodiment. The operating system in the present invention schedules the execution of applications A–G in the present invention and has access to the entire memory to transfer data between the applications.

Figure 4:
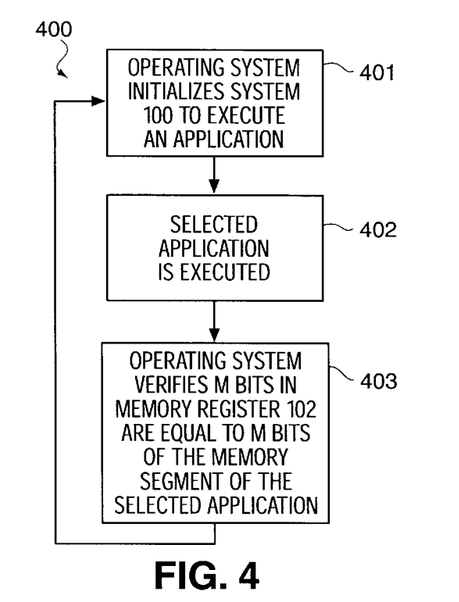
FIG. 4 is a flow chart of an operational overview of the preferred exemplary embodiment of FIG. 1.

An operational overview of a multi-tasking system with the memory protection features in accordance with the present invention is illustrated in FIG. 4. Process 400 begins with step 401 in which the operating system initializes the system to execute one of applications A–G. In step 402, a selected application, such as application A, is executed by processor 101. The operating system verifies that m upper address bits in memory register 102 are equal to the m upper address bits of application A in step 403. Process 400 is repeated each time an application A–G is executed by processor 101.

Figure 5:
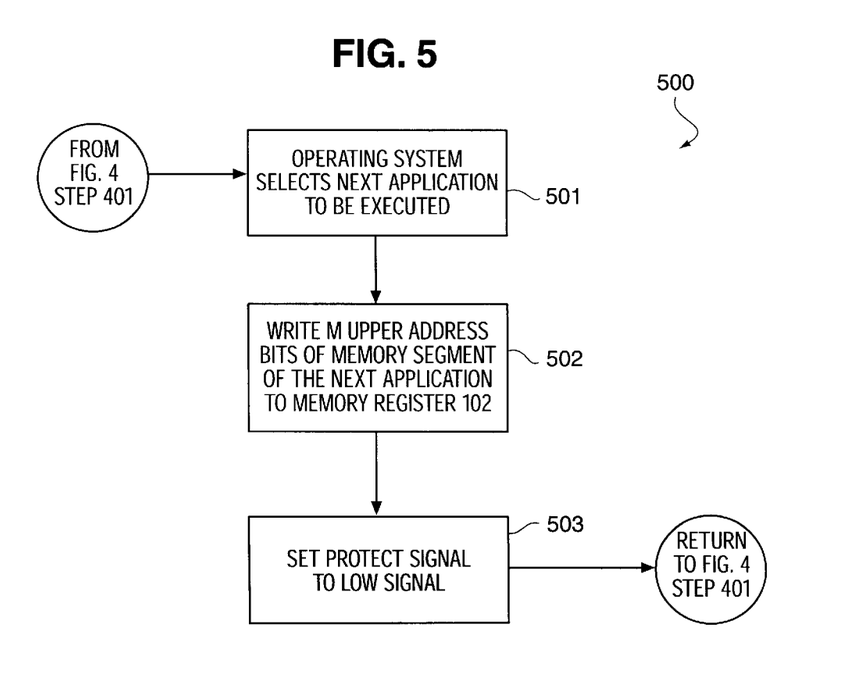
FIG. 5 is a flow chart of a process for preparing to execute an application in the preferred exemplary embodiment.

The initializing of multi-tasking system 100 performed by the operating system in step 401 is illustrated by process 500 in FIG. 5. First, the operating system selects an application, for example application A, to be executed in step 501. The m upper address bits, 001, of the memory segment assigned to store data for application A are written by the operating system to memory register 102 in step 502. In step 503, the protect signal 115 is set to a low to indicate that application A is being executed by processor 101. Process 500 then returns to step 401 of process 400 in FIG. 4.

Figure 6:
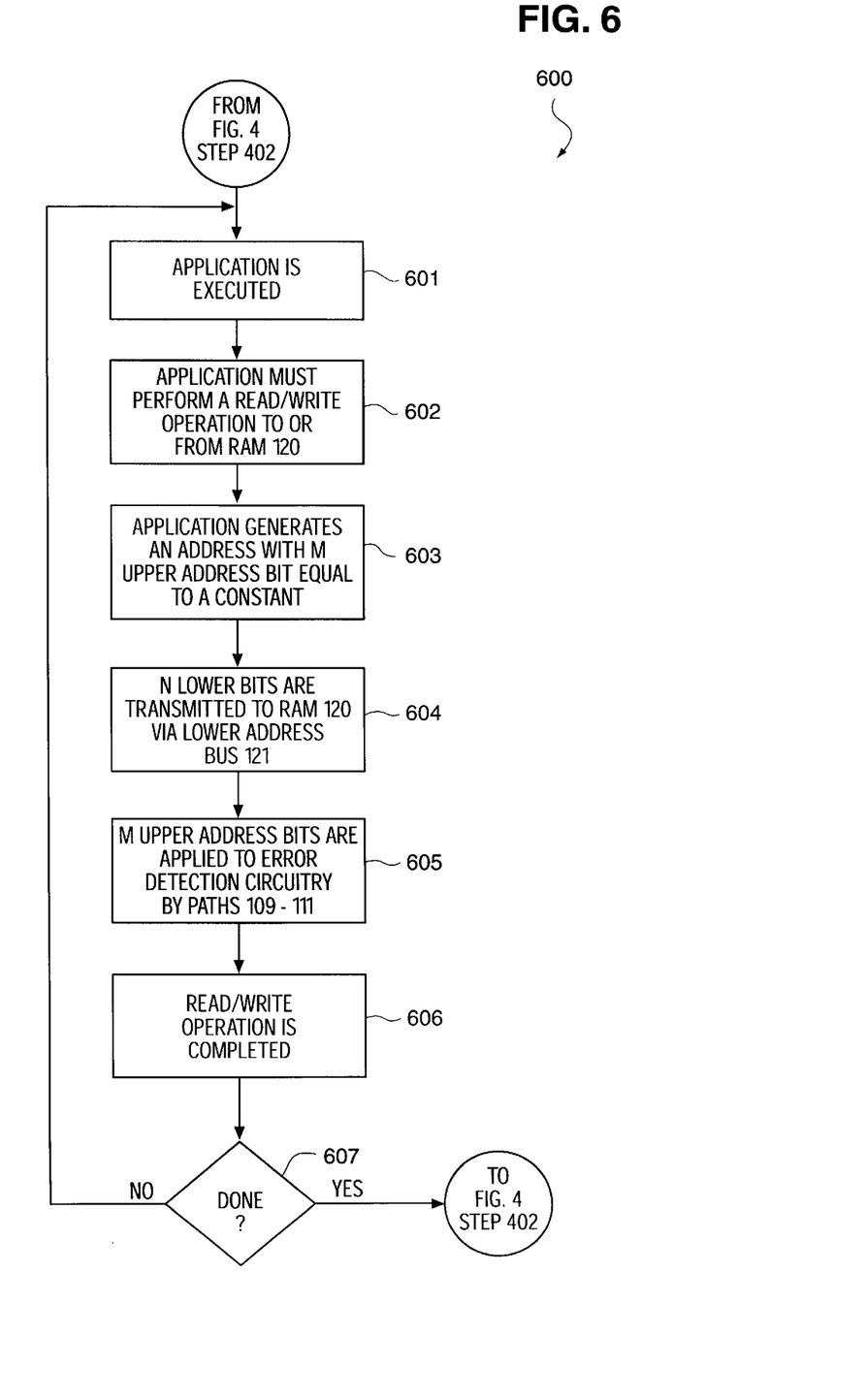
FIG. 6 is a flow chart of a process of executing a read/write operation during execution of application in the preferred exemplary embodiment.

FIG. 6 illustrates process 600 which executes application A in step 402 of process 400. Process 600 begins in step 601 with application A being executed. In step 602, application A must perform a read/write operation to or from RAM 120. An address is generated by application A to perform a read/write operation in step 603. The generated address has m upper address bits that are set to a constant. In the preferred embodiment, each m upper address bits is a 0. The generated n lower address bits are transmitted to RAM 120 via the lower address bus 121 in step 604. The m upper bits of the address for the read/write operation are received by RAM 120 from memory register 102 via the upper address bus represented by paths 122–124.

The m upper address bits generated in step 603 are transmitted by processor 101 to the error detection circuitry via bus 105 and paths 109–111 in step 605. The error detection circuitry determines if an invalid address has been generated. The read/write operation is completed in step 606. Process 600 is completed in step 607 which determines whether the execution of the application is completed. If execution of the application is not completed, step 607 repeats process 600 beginning with step 601. If the execution is completed, process 600 returns to step 402 of process 400 on FIG. 4.

Figures 7, 8:
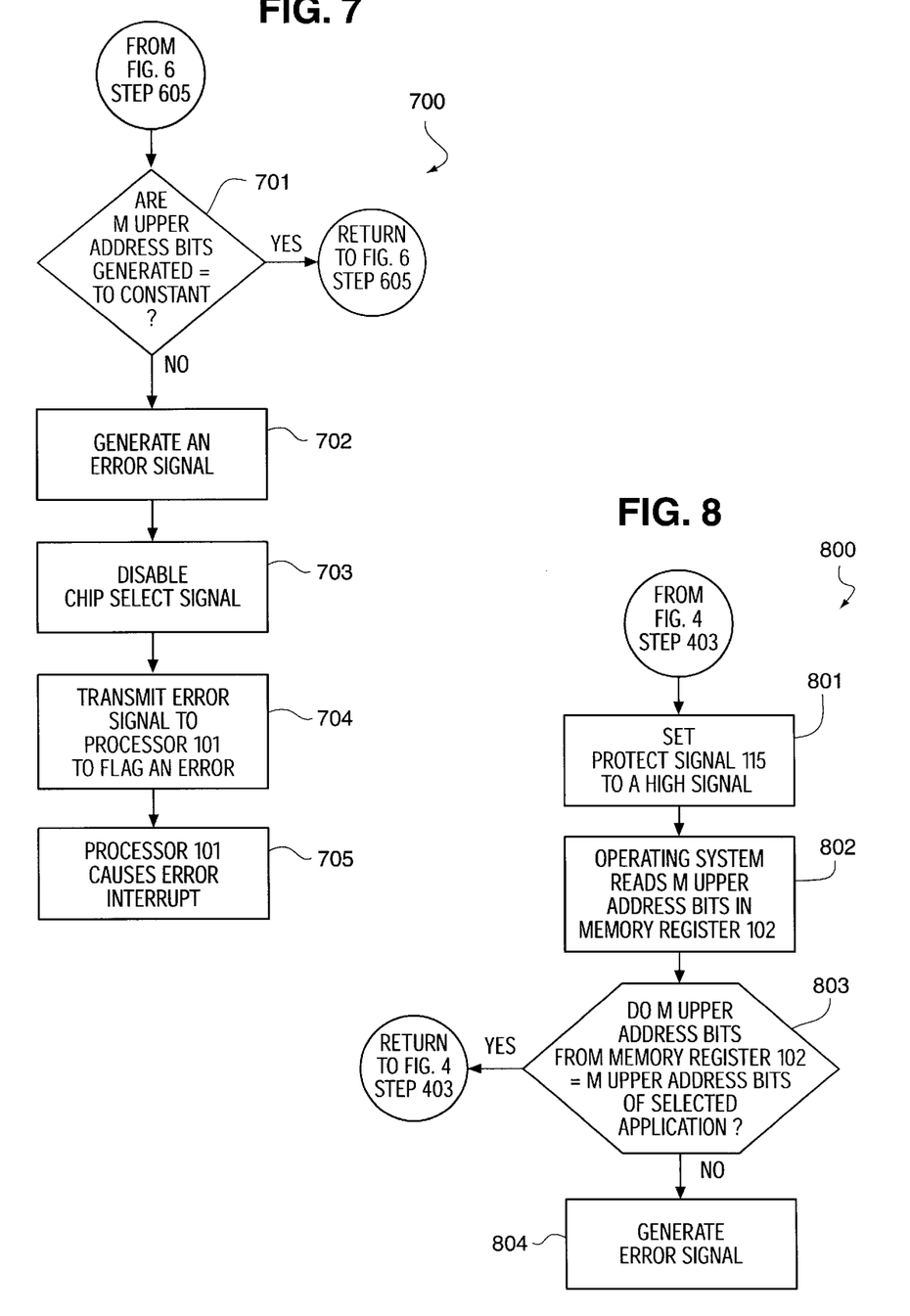
FIG. 7 is a flow chart of a process for determining if an application has generated an invalid address in the preferred exemplary embodiment.
FIG. 8 is a flow chart of a process for detecting a change in m upper address bits stored in memory register after an application has been executed in the preferred exemplary embodiment.

The error detection circuitry receives the m upper address bits in step 605 and completes process 700 illustrated in FIG. 7. Process 700 protects the data in the memory segment storing data for the application being executed in process 600. Memory register 102 transmits the proper m bits for the memory segment of the application being executed to prevent an application from ever writing data outside its memory segment. In response to certain conditions, such as a stack overflow error, an application may attempt to generate an address that is outside its memory segment. However, the combination of n bits from the invalid address and the m bits from memory register 102 creates an address inside the memory segment of the application, which may contain valid data. The error detection circuitry must detect any invalid upper address bits and disable the data operation to prevent a corruption of valid data in the memory segment of the application.

Process 700 begins with step 701 which determines whether the upper m bits are equal to the constant. In the preferred embodiment, the m bits generated by the application are each zero and the error detection circuitry detects bits that are not equal to zero. If the m bits are equal to the constant, process 700 returns to step 605 of process 600 illustrated in FIG. 6. If the m upper address bits are not equal to the constant, process 700 generates an error signal in step 702. In response the error signal, step 703 disables the chip select signal to halt the read/write operation to prevent the corrupting of data in the memory segment of the application. In the preferred embodiment, steps 701–703 are executed by the error detection circuitry as described above in FIG. 1.

In step 704 of FIG. 7, the error signal generated in step 702 is transmitted to processor 101. In step 705, processor 101 either causes an error interrupt or sets an error flag in response to receiving the error signal. The response of processor 101 is determined by the operating system and is a design choice of a maker of the present invention. Error recovery from steps 703 and step 704 is not discussed, since error recovery is outside the scope of the present invention.

FIG. 8 illustrates error detection process 800 executed by the operating system in step 403 of process 400. First, the protect signal 115 is set to a high signal which indicates that the operating system is being executed in step 801. In step 802, memory register 102 is read by the operating system. The m upper address bits read from memory register 102 are compared by the operating system to the m upper address bits for the memory segment of the application that was completed in step 803. If the m upper address bits are not equal, an error signal is generated by the operating system in step 804. Otherwise, process 800 returns to step 403 of process 400 in FIG. 4.

The present invention relates to providing memory protection in a multi-tasking system. Although specific examples are disclosed for example herein, it is expected that persons skilled in the art can and will design alternative memory protection systems that are within the scope of the following claims either literally or under the Doctrine of Equivalents.

What is claimed is:

1. A memory protection system for a processor controlled multi-tasking system comprising:

a memory associated with said processor having memory addresses defined by m upper address bits and n lower address bits;

a plurality of segments in said memory each defined by a unique combination of said m upper address bits;

a plurality of applications executable by said processor each of which writes data to a different unique one of said plurality of memory segments;

each of said plurality of applications being compiled to generate a memory address for a data operation comprising m upper address bits that are set to a constant and n lower address bits;

a memory register for storing m upper address bits of said one of said plurality of segments in said memory that stores data for a one of said plurality of applications;

means for writing said unique combination of m upper address bits of said one of said plurality of segments in said memory storing data for said one of said applications to said memory register prior to said processor executing said one application;

said processor executes said one of said plurality of applications which generates an address for a data operation;

a lower address bus for transmitting said n lower address bits from said processor to said memory responsive to said generating of said address;

an upper address bus for transmitting said m upper address bits from said memory register to said memory during said execution of said one of said plurality of application;

means responsive to said generating of said address for determining said m upper address bits generated by said one of said plurality of applications are not equal to said constant; and means for generating an error signal responsive to a determination said m upper address bits are not equal to said constant.

2. The memory protection system of claim 1 further comprising:

means responsive to said generating of said error signal for halting said read/write operation.

3. The memory protection system of claim 1 further comprising:

means for transmitting said error signal to said processor; and means for generating an error interrupt responsive to said processor receiving said error signal.

4. The memory protection system of claim 1 further comprising:

an operating system executable by said processor for scheduling execution of said plurality of applications wherein said operating system has access to all of said memory; and means connected to said upper address bus for selectively transmitting said m upper address bits generated by said operating system over said upper address bus to said memory responsive to said operating system being executed by said processor; and for selectively transmitting said m upper address bits from said memory register responsive to said one of said plurality of applications is being executed by said processor.

5. The memory protection system of claim 4 wherein said means for selectively transmitting comprises:

means for generating a protect signal to indicate said operating system is being executed by said processor;

means for receiving said protect signal; and means for transmitting said m upper address bits generated by said operating system from said processor responsive to said reception of said protect signal.

6. The memory protection system of claim 5 further comprising:

means for disabling said means for determining whether said m upper address bit generated by said one of said plurality of applications is equal to said constant responsive to said generation of said protect signal.

7. The memory protection system of claim 1 further comprising:

means for detecting whether said m bits in said memory register after said one of said plurality of application has been executed are equal to said m bits stored in said register prior to said one of said plurality of applications being executed;

means for generating an error signal responsive to said detection of m bits being unequal.

8. A method for preventing one application in a multi-tasking system from writing data to a segment of a memory storing data for a second application comprising the steps of:

compiling said one application to generate an address for a data operation comprising m upper address bits set to a constant and n lower address bits;

writing m upper address bits defining a segment of memory storing data for said one application to a memory register;

executing said one application with a processor;

transmitting said m upper address bits in said memory register to said memory during said executing of said one application;

generating an address for a read/write operation for said one application;

transmitting said generated n lower address bits to said memory;

determining that said generated m upper address bits are not equal to said constant; and generating an error signal responsive to a determination said m upper address bits are not equal to said constant.

9. The method of claim 8 further comprising the step of:

halting said data operation responsive to said generating of said error signal.

10. The method of claim 8 further comprising the step of:

generating an error interrupt responsive to said generating of said error signal.

11. The method of claim 8 further comprising the steps of:

periodically executing an operating system having access to all segments of said memory for coordinating execution of a plurality of applications by said processor;

generating an address for a data operation of said operating system which has m upper address bits and n lower address bits; and transmitting said m upper address bits and said n lower address bits generated by said supervisor application to said memory.

12. The method of claim 8 further comprising the steps of:

comparing said m upper address bits stored in said memory register after said executing of said one application is complete with said m upper address bits of said memory segment of said one application; and generating an error interrupt signal responsive to said m upper address bits being unequal.

* * * * *